(12) United States Patent
Shi et al.

(10) Patent No.: US 12,490,320 B2
(45) Date of Patent: Dec. 2, 2025

(54) DATA TRANSMISSION METHOD AND NETWORK DEVICE

(71) Applicant: GUANGDONG OPPO MOBILE TELECOMMUNICATIONS CORP., LTD., Dongguan (CN)

(72) Inventors: Cong Shi, Dongguan (CN); Shukun Wang, Dongguan (CN); Haitao Li, Dongguan (CN); Xue Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 434 days.

(21) Appl. No.: 18/083,338

(22) Filed: Dec. 16, 2022

(65) Prior Publication Data

US 2023/0123866 A1    Apr. 20, 2023

Related U.S. Application Data

(63) Continuation of application No. PCT/CN2020/097152, filed on Jun. 19, 2020.

(51) Int. Cl.
*H04W 76/12* (2018.01)
*H04W 8/00* (2009.01)
(Continued)

(52) U.S. Cl.
CPC ........... *H04W 76/12* (2018.02); *H04W 76/27* (2018.02); *H04W 76/30* (2018.02)

(58) Field of Classification Search
CPC ...... H04W 76/12; H04W 76/30; H04W 76/27
(Continued)

(56) References Cited

U.S. PATENT DOCUMENTS

| 2020/0022044 A1* | 1/2020 | Kim ..................... H04W 48/20 |
| 2020/0037210 A1 | 1/2020 | Rugeland et al. |

(Continued)

FOREIGN PATENT DOCUMENTS

| CN | 108617000 A | 10/2018 |
| CN | 108632810 A | 10/2018 |

(Continued)

OTHER PUBLICATIONS

Guangdong Oppo Mobile Telecommunications Corp., Ltd., International Search Report and Written Opinion, PCT/CN2020/097152, Mar. 11, 2021, 14 pgs.

(Continued)

*Primary Examiner* — Xuan Lu
(74) *Attorney, Agent, or Firm* — Morgan, Lewis & Bockius LLP

(57) ABSTRACT

Provided in embodiments of the present application are a data transmission method and a network device, which can implement small data transmission under the circumstance that a context of a terminal device is not migrated. The data transmission method comprises: a target base station sends first information to an anchor base station, the first information comprising uplink data sent by an inactive state terminal device, wherein the first information is transmitted by a container carrying means, or the first information is transmitted by a tunnel carrying means.

8 Claims, 6 Drawing Sheets

(51) Int. Cl.
  *H04W 48/20* (2009.01)
  *H04W 76/27* (2018.01)
  *H04W 76/30* (2018.01)
(58) Field of Classification Search
  USPC .......................................................... 370/328
  See application file for complete search history.

(56) References Cited

U.S. PATENT DOCUMENTS

| | | | | |
|---|---|---|---|---|
| 2020/0389882 | A1* | 12/2020 | Zhang ................... | H04W 72/27 |
| 2020/0404570 | A1* | 12/2020 | Wang ...................... | H04W 8/08 |
| 2021/0307100 | A1* | 9/2021 | Talebi Fard .......... | H04W 76/18 |
| 2022/0015007 | A1* | 1/2022 | Han ........................ | H04W 8/14 |
| 2022/0039198 | A1* | 2/2022 | Liu ........................ | H04W 76/22 |
| 2022/0287137 | A1* | 9/2022 | Futaki ................... | H04W 48/20 |
| 2023/0156820 | A1* | 5/2023 | Wu .................... | H04W 74/0833 |
| | | | | 370/329 |

FOREIGN PATENT DOCUMENTS

| | | |
|---|---|---|
| CN | 110249703 A | 9/2019 |
| CN | 110622614 A | 12/2019 |
| CN | 110636565 A | 12/2019 |
| WO | WO2019160467 A1 | 8/2019 |
| WO | WO2021253417 A1 | 12/2021 |

OTHER PUBLICATIONS

Qualcomm Incorporated, "Small data transmission in inactive state", 3GPP TSG-RAN WG3 NR Ad Hoc Meeting, Tdoc R3-170158, Spokane, Washington, USA, Jan. 17-19, 2017, 4 pgs.
3GPP TS 29.281 V16.0.0 (Dec. 2019); Technical Specification Group Core Network and Terminals; General Packet Radio System (GPRS) Tunnelling Protocol User Plane (GTPv1-U) (Release 16), 33 pgs.
3GPP TS 36.331 V16.0.0 (Mar. 2020); Technical Specification Group Radio Access Network; Evolved Universal Terrestrial Radio Access (E-UTRA); Radio Resource Control (RRC); Protocol specification (Release 16), 1046 pgs.
3GPP TS 38.331 V16.0.0 (Mar. 2020); Technical Specification Group Radio Access Network; NR; Radio Resource Control (RRC) protocol specification (Release 16), 832 pgs.
3GPP TS 38.414 V16.0.0 (Jul. 2020); Technical Specification Group Radio Access Network; NG-RAN; NG data transport (Release 16), 8 pgs.
3GPP TS 38.423 V16.0.0 (Dec. 2019); Technical Specification Group Radio Access Network; NG-RAN; XN application protocol (XnAP) (Release 16), 330 pgs.
3GPP TS 38.424 V16.0.0 (Jul. 2020); Technical Specification Group Radio Access Network; NG-RAN; Xn data transport (Release 16), 8 pgs.
CATT, "TP on UL small data transmission in inactive state," 3GPP TSG-RAN WG3 #Ad-hoc, R3-170074, Spokane, Washington, USA, Jan. 17-19, 2017, 2 pgs.
Guangdong Oppo Mobile Telecommunications Corp., Ltd., Extended European Search Report, EP20940965.5, Jun. 2, 2023, 11 pgs.

* cited by examiner

DATA TRANSMISSION METHOD AND NETWORK DEVICE

CROSS-REFERENCE TO RELATED APPLICATIONS

This application is a continuation application of PCT Patent Application No. PCT/CN2020/097152, entitled "DATA TRANSMISSION METHOD AND NETWORK DEVICE" filed on Jun. 19, 2020, which is incorporated herein by reference in its entirety.

TECHNICAL FIELD

The embodiments of the present disclosure relate to the field of communications, and more specifically, to a data transmission method and network device.

BACKGROUND

The New Radio (NR) system supports early data transmission. After a target base station receives uplink data sent by a terminal device, it needs to migrate context of the terminal device from an anchor base station to the target base station, so that the target base station can send the uplink data to a core network, which increases signaling overhead generated in migrating the context of the terminal device between base stations.

SUMMARY

The embodiments of the present disclosure provide a data transmission method and a network device.

In a first aspect, there is provided a data transmission method, and the method includes:
  sending, by a target base station, first information to an anchor base station, where the first information includes uplink data sent by a terminal device in an inactive state, and the first information is transmitted in a container bearing manner, or the first information is transmitted in a tunnel bearing manner.

In a second aspect, there is provided a data transmission method, and the method includes:
  receiving, by an anchor base station, first information sent by a target base station, where the first information includes uplink data sent by a terminal device in an inactive state, and the first information is transmitted in a container bearing manner, or the first information is transmitted in a tunnel bearing manner.

In a third aspect, there is provided a network device, configured to perform the method performed by the target base station in the first aspect above.

Specifically, the network device includes functional modules for performing the method performed by the target base station in the first aspect above.

In a fourth aspect, there is a network device, configured to perform the method performed by the anchor base station in the second aspect above.

Specifically, the network device includes functional modules for performing the method performed by the anchor base station in the second aspect above.

In a fifth aspect, there is provided a network device including a processor and a memory. The memory is used for storing a computer program, and the processor is configured to call and run the computer program stored in the memory to perform the method performed by the target base station in the above first aspect.

In a sixth aspect, there is provided a network device including a processor and a memory. The memory is used for storing a computer program, and the processor is configured to call and run the computer program stored in the memory to perform the method performed by the anchor base station in the above second aspect.

In a seventh aspect, there is provided a device, configured to carry out the method in any one of the above first to second aspects.

Specifically, the device includes a processor configured to call and run a computer program from a memory, to cause an apparatus installed with the device to perform the method in any one of the above first to the second aspects.

In an eighth aspect, there is provided a computer-readable storage medium for storing a computer program that causes a computer to carry out the method in any one of the above first to second aspects.

In a ninth aspect, there is provided a computer program product including computer program instructions that cause a computer to perform the method in any one of the above first to second aspects.

In a tenth aspect, there is provided a computer program which, when running on a computer, causes the computer to perform the method in any one of the above first to second aspects.

DETAILED DESCRIPTION

Figure 1:
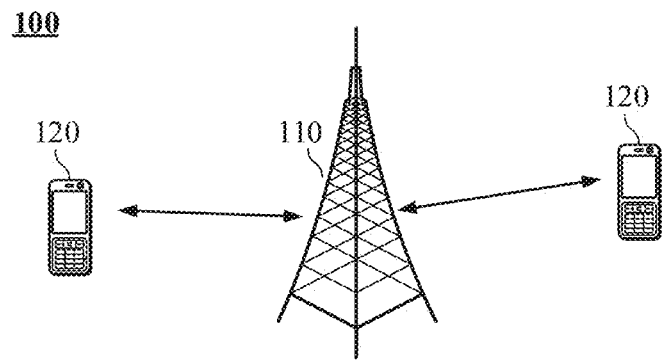
FIG. 1 is a schematic diagram of an architecture of a communication system provided by the present disclosure.

The technical solutions in the embodiments of the present disclosure will be described below in connection with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, a Non-Terrestrial Networks (NTN) system, a Universal Mobile Telecommunication System (UMTS), Wireless Local Area Networks (WLAN), a Wireless Fidelity (WiFi), a 5th-Generation (5G) communication system or other communication systems.

Generally, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, Vehicle to everything (V2X) communication, etc. The embodiments of the present disclosure can also be applied to these communication systems.

In some embodiments, the communication system in the embodiments of the present disclosure can be applied to a carrier aggregation (CA) scenario, a dual connectivity (DC) scenario, or a standalone (SA) deployment scenario.

In some embodiments, the communication system in the embodiments of the present disclosure may be applied to an unlicensed spectrum, where the unlicensed spectrum may also be considered as a shared spectrum; or, the communication system in the embodiments of the present disclosure may also be applied to a licensed spectrum, where the licensed spectrum can also be considered an unshaved spectrum.

Various embodiments are described in conjunction with the network device and the terminal device in the embodiments of the present disclosure, where the terminal device may also be referred to as User Equipment (UE), an access terminal, a subscriber unit, a subscriber station, a mobile station, a remote station, a remote terminal, a mobile device, a user terminal, a terminal, a wireless communication device, a user agent, a user device, or the like.

The terminal device may be a station (ST) in the WLAN, or may be a cellular phone, a cordless phone, a Session Initiation Protocol (SIP) phone, a Wireless Local Loop (WLL) station, a personal digital Personal Digital Assistant (PDA) device, a handheld devices with wireless communication capabilities, a computing device or other processing devices connected to a wireless modem, an in-vehicle device, a wearable device, a terminal device in next-generation communication systems such as a NR network, or a terminal device in a future evolved public land mobile network (PLMN) network, etc.

In the embodiments of the present disclosure, the terminal device can be deployed on land, including indoor or outdoor, handheld, wearable, or vehicle-mounted; or it can be deployed on water (such as on a ship, etc.); or it can be deployed in the air (such as on an airplane, a balloon, a satellite, etc.).

In the embodiments of the present disclosure, the terminal device may be a mobile phone (Mobile Phone), a Pad, a computer with a wireless transceiving function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example instead of a limitation, in the embodiments of the present disclosure, the terminal device may also be a wearable device. The wearable device can also be referred to as a wearable smart device, which is a general term for wearable devices which are designed and developed by using wearable technology to intelligently design and develop everyday wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes full-featured and large-sized devices of which complete or partial functions can be achieved without relying on smart phones, such as smart watches or smart glasses, and devices which focus on only a certain type of application function and need to cooperate with other devices such as smart phones, such as various smart bracelets and smart jewelry for physical sign monitoring.

In the embodiments of the present disclosure, the network device can be a device used to communicate with a mobile device. The network device can be an access point (AP) in WLAN, a Base Transceiver Station (BTS) in GSM or CDMA, or a NodeB (NB) in WCDMA, and can also be an Evolutional Node B (eNB or eNodeB) in LTE, a relay station, an access point, a vehicle-mounted device, a wearable device, a network device or base station (gNB) in a NR network, a network device in future evolutional PLMN network, a network device in a NTN network, or the like.

As an example but not a limitation, in the embodiments of the present disclosure, the network device may have a mobile feature, for example, the network device may be a moving device. In some embodiments, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. In some embodiments, the network device may also be a base station set in a location such as on land or in water.

In the embodiments of the present disclosure, the network device may provide services for a cell, and the terminal device communicates with the network device through transmission resources (for example, frequency domain resources, or spectrum resources) used by the cell. The cell may be a cell corresponding to the network device (e.g., a cell corresponding to the base station), or belong to a macro base station or a base station corresponding to a small cell. The small cell herein can include a Metro cell, a Micro cell, a Pico cell, a femto cell, etc., which are characterized in small coverage and low transmission power, and are suitable for providing high-rate data transmission services.

Exemplarily, a communication system to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area.

FIG. 1 exemplarily shows one network device and two terminal devices. In some embodiments, the communication system 100 may include multiple network devices and other numbers of terminal devices can be included in the coverage of each network device, which is not particularly limited in the embodiments of the present disclosure.

In some embodiments, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

It should be understood that "indication" mentioned in the embodiments of the present disclosure may be a direct indication or an indirect indication, or may represent an associated relationship. For example, if A indicates B, it may represent that A directly indicates B, for example, B can be obtained from A; or it may represent that A indicates B indirectly, for example, A indicates C, and B can be obtained from C; or it may represent that there is an associated relationship between A and B.

In the description of the embodiments of the present disclosure, the term "corresponding" may indicate that there is a direct or indirect corresponding relationship between two objects, or may indicate that there is an associated relationship, a relationship of indicating and being indicated, or a relationship of configuring, and being configured between the two objects, and so on.

It should be understood that in the embodiments of the present disclosure, NR can also be deployed independently. In order to reduce radio signaling and quickly resume wireless connections and data services in the 5G network environment, a new Radio Resource Control (RRC) state, that is, RRC_INACTIVE state is defined. This state is different from RRC_IDLE and RRC_CONNECTED states.

In the RRC_IDLE state: mobility is based on cell selection and reselection of the terminal device, paging is initiated by a core network (CN), and the paging area is configured by the CN. There is no Access Stratum (AS) context of the terminal device on the base station side, and there is no RRC connection.

In the RRC_CONNECTED state: there is an RRC connection, and the base station and the terminal device have the terminal device AS context. The network device knows the location of the terminal device at the specific cell level. Mobility is mobility controlled by the network device. Unicast data can be transmitted between the terminal device and the base station.

RRC_INACTIVE: Mobility is based on cell selection and reselection of the terminal device, there is a CN-NR connection, the AS context of the terminal device exists on a certain base station, and paging is triggered by a Radio Access Network (RAN), the RAN-based paging area is managed by the RAN, and the network device knows the location of the terminal device at the RAN paging area level.

It should be noted that, in the embodiments of the present disclosure, the inactive state may also be referred to as a deactivated state, which is not limited in the present disclosure.

Figure 2:
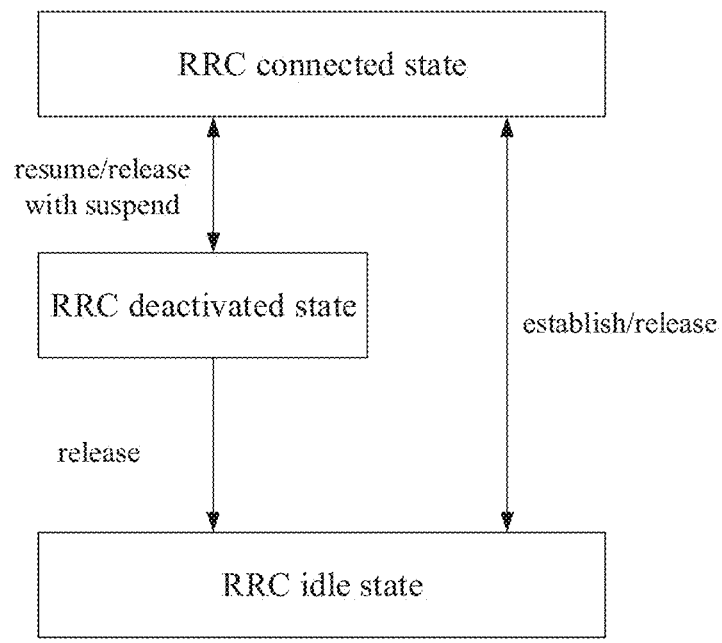
FIG. 2 is a schematic diagram of a state transition of a terminal device provided by the present disclosure.

The network device can control the state transition of the terminal device. For example, as shown in FIG. 2, the terminal device in the RRC_CONNECTED state can enter the RRC_IDLE state by releasing the RRC connection; the terminal device in the RRC_IDLE state can enter the RRC_CONNECTED state by establishing an RRC connection; the UE in the RRC_CONNECTED state can enter the RRC_INACTIVE state by releasing the RRC connection with suspend (Release with Suspend); the UE in the RRC_INACTIVE state can enter the RRC_CONNECTED state by resuming the RRC connection, or it can enter the RRC_IDLE state by releasing the RRC connection.

It should be noted that when the terminal device is in the RRC_INACTIVE state, it automatically returns to the idle state in the following situations:
  when receiving an paging message initiated by the CN;
  when initiating the RRC resume request, start timer T319, and if the timer expires;
  when contention-based random access message 4 (Message4, MSG4) integrity protection verification fails;
  when the cell is reselected to other Radio Access Technology (RAT); and
  when entering a state of camping on any cell.

Characteristics of the RRC_INACTIVE state include:
  the connection between RAN and CN is maintained;
  the terminal device and at least one gNB save the AS context;
  the terminal device is accessible to the RAN side, and the relevant parameters are configured by the RAN;
  when the terminal device moves within a RAN Notification Area (RNA) configured by the RAN, it does not need to notify the network side (core network device), but it needs to notify the network side (core network device) when moving out of the RNA; and
  the UE moves within the RNA according to the cell selection and reselection manner.

Figure 3:
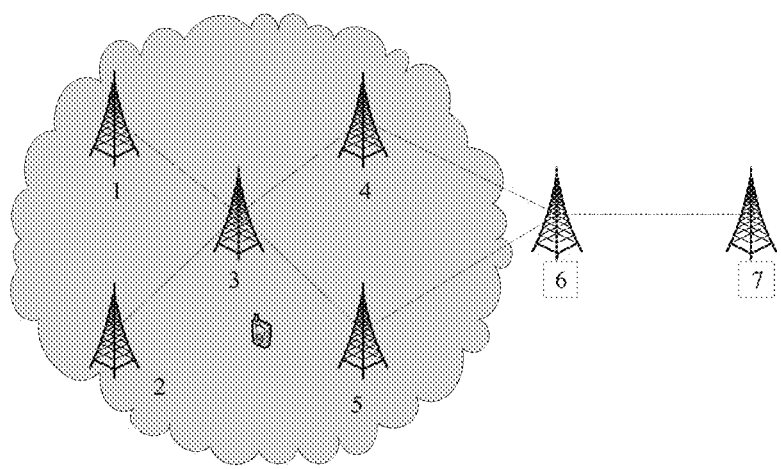
FIG. 3 is a schematic diagram of an inactive state terminal device RNA provided by the present disclosure.

It should be noted that the RNA can be specifically as shown in FIG. 3. In the RNA shown in FIG. 3, when the terminal device moves between base station 1 to base station 5, it does not need to notify the network side, but when the terminal device moves to base station 6 or base station 7, it needs to notify the network side.

When the terminal device is in the RRC_INACTIVE state, the network device will configure RRC_INACTIVE configuration parameters for the terminal device through RRC Release dedicated signaling, for example, configuring RNA, and the RNA is used to control the area where the terminal device performs cell selection and reselection in the inactive state, which is also an initial paging range area of the RAN.

When the terminal device moves in the RNA area, it does not need to notify the network side, and it follows the mobility behavior in the idle state, that is, the cell selection and reselection principle. When the terminal device moves out of the paging area configured by the RAN, it will trigger the terminal device to resume the RRC connection and re-acquire the paging area configured by the RAN. When the terminal device has downlink data arriving, the gNB that maintains the connection between RAN and CN for the terminal device will trigger all cells in the RAN paging area to send paging messages to the terminal device, so that the terminal device in the INACTIVE state can resume the RRC connection and perform data reception. The terminal device in the INACTIVE state is configured with a RAN paging area, and in this area, in order to ensure the accessibility of the terminal device, the terminal device needs to perform periodic location updates according to a period configured by the network.

Therefore, scenarios where the terminal device is triggered to perform RNA update include RAN Notification Area Update (RNAU) timer expiry or UE moving to an area outside the RNA.

It should be noted that, when the target base station with which the terminal device initiates the RRC connection resume process is not an anchor base station, the anchor base station determines whether to transfer the context of the terminal device to the target base station. Therefore, in general, the target base station will send a cause value (cause) carried in a RRC connection resume request message initiated by the terminal device to the anchor base station during the context retrieving process of the terminal device, and the anchor base station will decide whether to transfer the context of the terminal device to the target base station. For example, for the periodic RAN location update, it generally does not need to perform context transferring.

Figure 4:
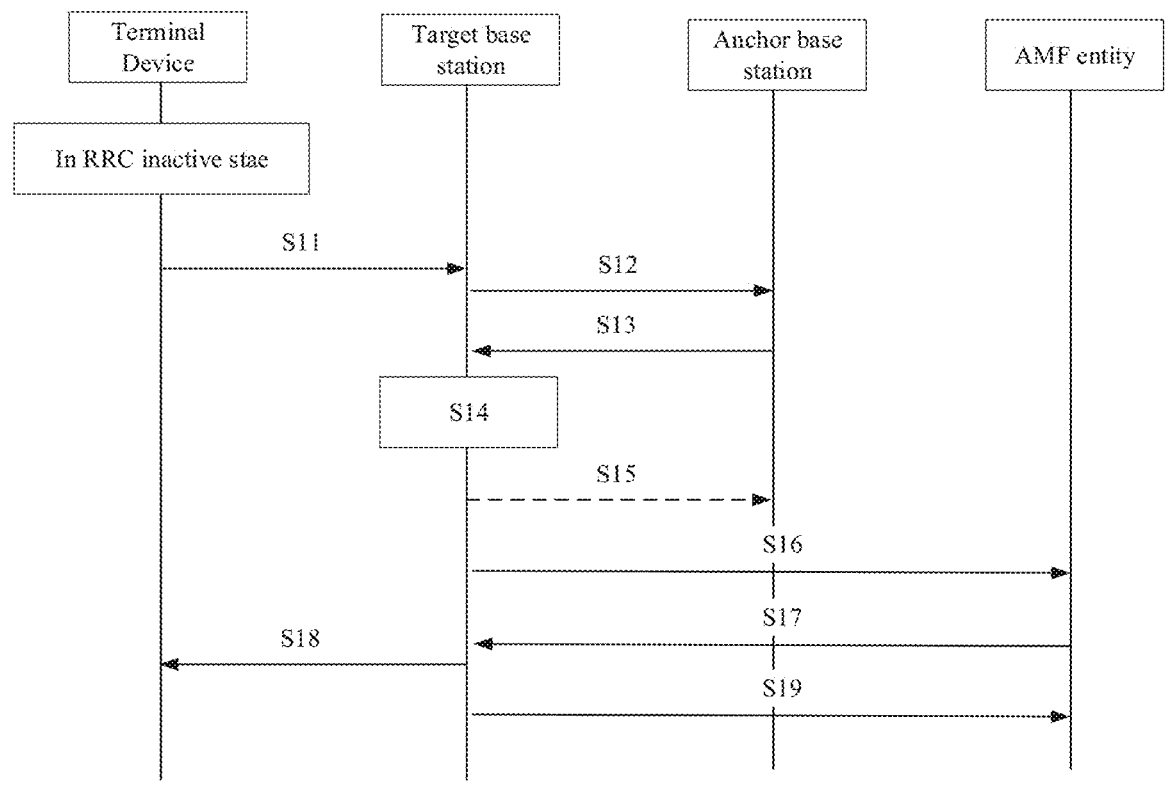
FIG. 4 is a schematic flowchart of RAN-based Notification Area Update (RNAU) with context migrating provided by the present disclosure.

For example, as shown in FIG. 4, RNAU with context migration is specifically implemented through the processes in S11 to S19 below.

In S11, the terminal device (UE) sends an RRC connection Resume Request to the target base station (gNB), and the RRC connection Resume Request is used for RNA update.

In S12, the target base station sends a RETRIEVE UE CONTEXT REQUEST to the anchor base station (also called Last Serving gNB).

In S13, the anchor base station sends a RETRIEVE UE CONTEXT RESPONSE to the target base station.

In S14, the UE is set to an inactive state (INACTIVE).

In S15, the target base station sends a DATA FORWARDING ADDRESS INDICATION to the anchor base station (optional).

In S16, the target base station sends a path switching request to an Access and Mobility Management Function (AMF) entity.

In S17, the AMF entity sends a path switching response to the target base station.

In S18, the target base station sends an RRC release message to the terminal device.

In S19, the target base station sends a UE context release message to the anchor base station.

Figure 5:
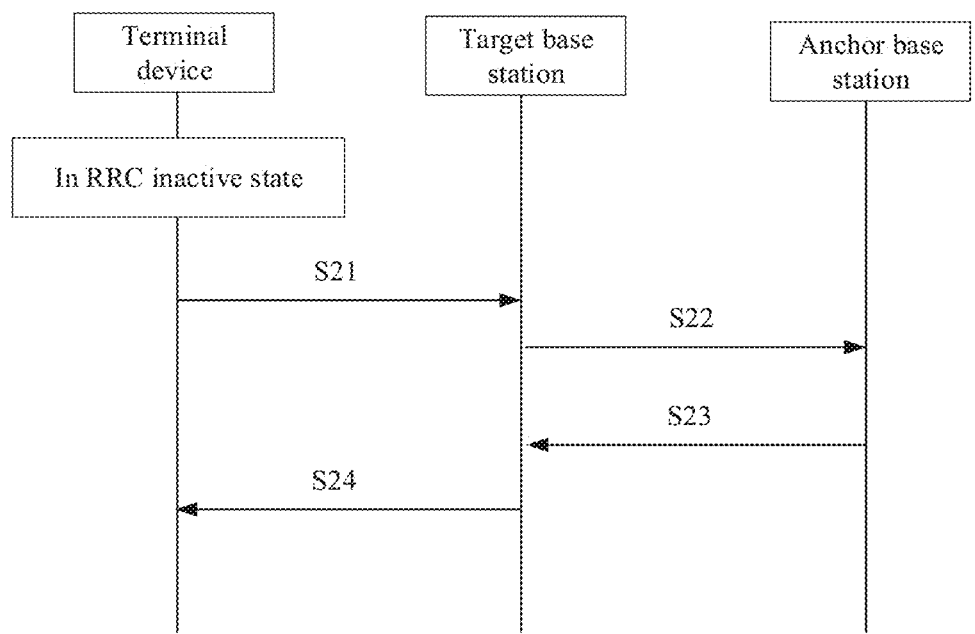
FIG. 5 is a schematic flowchart of RNAU without context migrating provided by the present disclosure.

For another example, as shown in FIG. 5, the RNAU without context migrating is specifically implemented through the processes in S21 to S24 below.

In S21, the terminal device (UE) sends an RRC connection Resume Request to the target base station (gNB), and the RRC connection Resume Request is used for RNA update.

In S22, the target base station sends a RETRIEVE UE CONTEXT REQUEST to the anchor base station (also called Last Serving gNB).

In S23, the anchor base station sends RETRIEVE UE CONTEXT FAILURE to the target base station.

In S24, the target base station sends an RRC release message to the terminal device.

Figure 6:
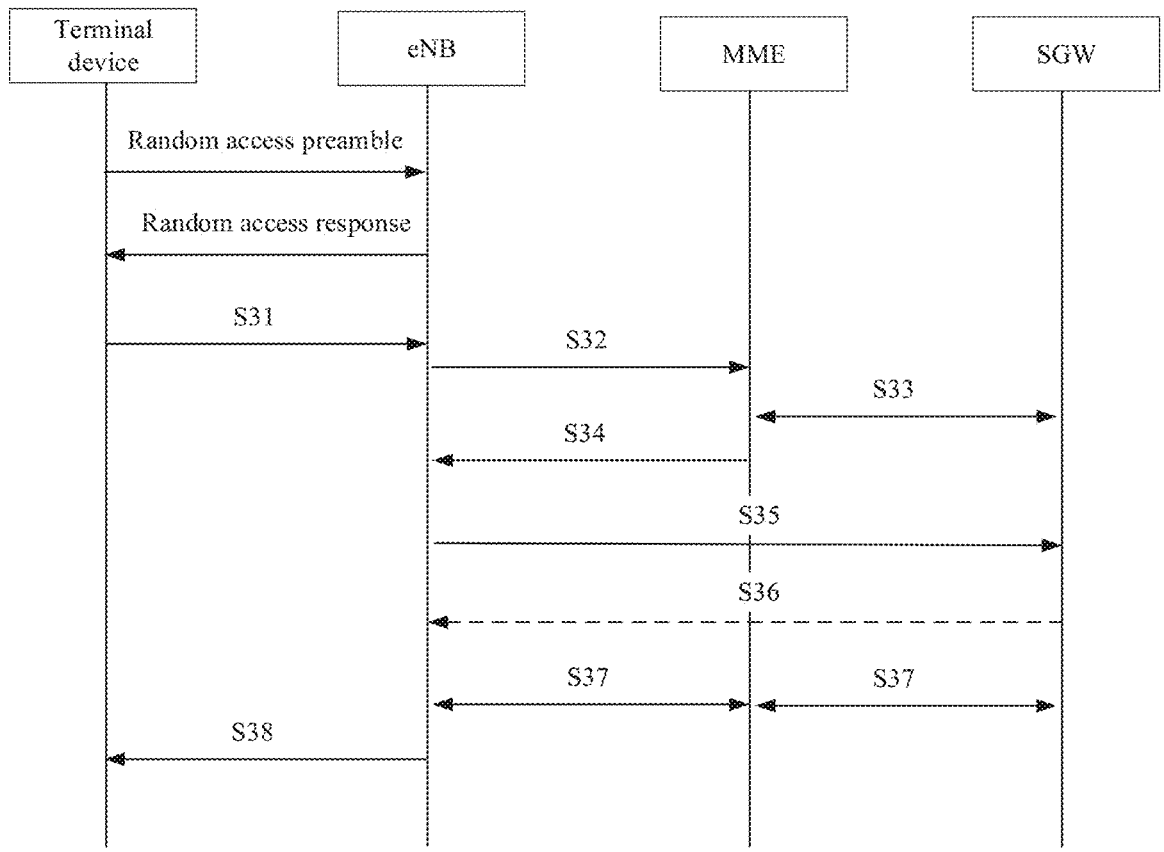
FIG. 6 is a schematic flowchart of early data transmission provided by the present disclosure.

In LTE, early data transmission (EDT) is introduced, and in this process, the terminal device may always remain in the idle state or suspend state or inactive state to complete the transmission of the uplink and/or downlink early data packets. For example, as shown in FIG. 6, the user plane data transmission solution may be specifically implemented through the processes in S31 to S38 below.

In S31, the UE sends an RRC connection Resume Request to the eNB, and the RRC connection resume request includes the uplink data sent by the UE (that is, early data transmission).

In S32, the eNB sends a UE CONTEXT RESUME REQUEST to a Mobility Management Entity (MME).

In S33, a bearer between the MME and a Serving Gateway (SGW) is modified.

In S34, MME sends UE CONTEXT RESUME RESPONSE to eNB.

In S35, the eNB sends the uplink data sent by the UE to the SGW (that is, early data transmission).

In S36, the SGW receives downlink data sent by the eNB (optional).

In S37, the process between the eNB and the SGW is suspended, and the bearer between the MME and the SGW is modified.

In S38, the eNB sends an RRC connection release message to the UE, and optionally, the RRC connection release message includes the downlink data.

It should be noted that for the early data transmission, the UE completes the transmission of early data packets without entering the connected state, which is different from entering the connected state to transmit Mobile Broadband (MBB) services.

In the early data transmission scheme, after the target base station receives the uplink data sent by the UE, it needs to migrate the UE, context first, that is, migrate the UE, context from the anchor base station to the target base station, and then the target base station can send the UE's data to the core network.

In order to further improve data transmission efficiency and reduce signaling overhead caused by migrating the UE context between base stations, the present disclosure introduces a data transmission method between base stations. Specifically, the present disclosure proposes a data transmission scheme in which the target base station can forward the uplink data sent by the inactive terminal device to the anchor base station without retrieving the context of the terminal device, so that the inactive terminal device can transmit the uplink data to the core network device. That is, the technical solution of the present disclosure can realize early data transmission without migrating the context of the terminal device.

The technical solutions of the present disclosure will be described in detail below by way of specific embodiments.

Figure 7:
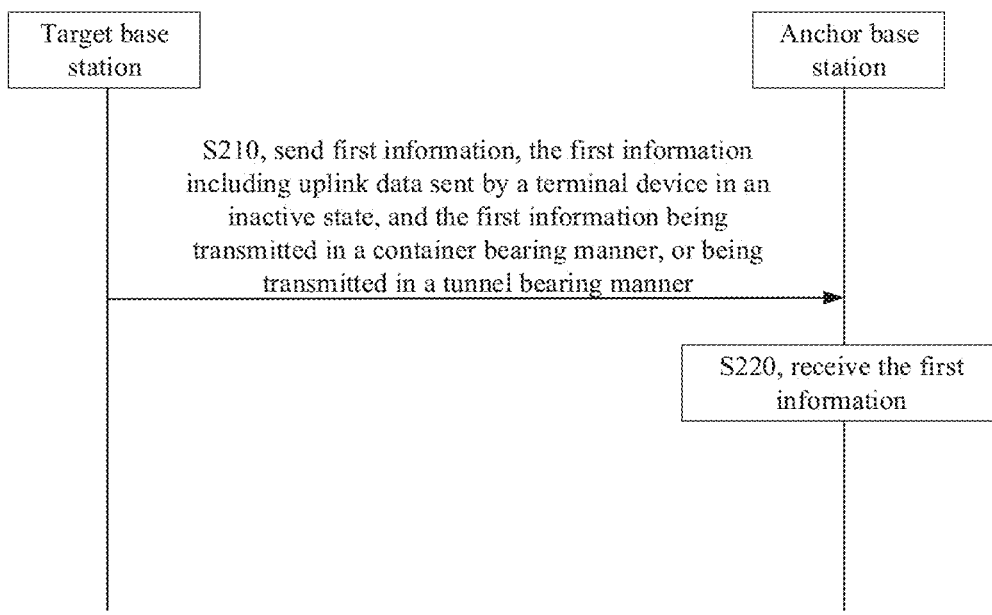
FIG. 7 is a schematic flowchart of a data transmission method according to an embodiment of the present disclosure.

FIG. 7 is a schematic flowchart of a data transmission method 200 according to an embodiment of the present disclosure. As shown in FIG. 7, the method 200 may include at least part of the following contents:

In S210, a target base station sends first information to an anchor base station, where the first information includes uplink data sent by a terminal device in an inactive state, and the first information is transmitted in a container bearing manner, or the first information is transmitted in a tunnel bearing manner.

In S220, the anchor base station receives the first information sent by the target base station.

It should be noted that, in the embodiment of the present disclosure, the terminal device is in the inactive state, the target base station may be a base station which the terminal device camps on, or the target base station may be a base station that the terminal device will access, and the anchor base station may be a base station that saves context information of the terminal device.

In some embodiments, the uplink data is early data transmission (EDT).

In some embodiments, before S210, the target base station receives RRC resume request information sent by the terminal device, where the RRC resume request information and the uplink data are multiplexed in one transport block.

For example, when a certain preset condition is met, the terminal device in the inactive state sends the RRC resume request information to the target base station, and the RRC resume request information and the uplink data are multiplexed in one transport block.

In some embodiments, the preset condition may be configured by a network device, or agreed in a protocol. For example, the preset condition may be a data threshold, a logical channel priority, or the like.

In some embodiments, in the embodiment of the present disclosure, the uplink data includes at least one of user plane data and control plane data.

For example, the user plane data is data in a Data. Radio Bearer (DRB).

For example, the control plane data is data in a Signaling Radio Bearer (SRB).

In Example 1, the first information is transmitted in the container bearing manner. In this case, the first information is invisible to the anchor base station, or the first information is transparently transmitted through the anchor base station, or the anchor base station cannot decode or interpret the content in the first information.

In Example 1, after receiving the first information, the anchor base station may forward the first information to a core network device. Since the first information is invisible to the anchor base station, the anchor base station cannot decode or interpret the content in the first information.

In some embodiments, in Example 1, the first information is used to request to retrieve context information of the terminal device from the anchor base station (retrieve UE context request).

In some embodiments, in Example 1, the anchor base station sends second information to the target base station, where the second information is used to indicate failure to retrieve the context information of the terminal device (retrieve UE context failure), or the second information includes the context information of the terminal device.

In some embodiments, in Example 1, in the case where the second information is used to indicate failure to retrieve the context information of the terminal device, the second information includes RRC release information, and the RRC release information is transmitted in the container bearing manner. Further, the target base station forwards the RRC release information to the terminal device.

In some embodiments, in Example 1, the second information includes first indication information, where the first indication information is used to indicate that the uplink data has been uploaded to the core network device.

In Example 2, the first information is transmitted in the tunnel bearing manner. In this case, the first information is visible to the anchor base station, or the anchor base station can decode and interpret the content in the first information.

In Example 2, after receiving the first information, the anchor base station may forward the uplink data to the core network device.

In some embodiments, in Example 2, the target base station triggers establishment of the tunnel. That is to say, in example 2, the target base station needs to establish the tunnel in advance.

In some embodiments, triggering establishment of the tunnel by the target base station may specifically include:
  the target base station sends third information to the anchor base station, where the third information includes information for establishing the tunnel and information for indicating that the uplink data has been received;
  the anchor base station sends fourth information to the target base station, where the fourth information includes information for establishing the tunnel fed back by the anchor base station.

In some embodiments, the information for establishing the tunnel may be a GPRS Tunneling Protocol (GTP) Tunnel.

In some embodiments, the third information is used to request to retrieve the context information of the terminal device from the anchor base station.

In some embodiments, in Example 2, the target base station receives fifth information sent by the anchor base station, where the fifth information is used to indicate failure to retrieve the context information of the terminal device, or the fifth information includes the context information of the terminal device.

In some embodiments, in Example 2, in the case where the fifth information is used to indicate failure to retrieve the context information of the terminal device, the fifth information includes RRC release information, and the RRC release information is transmitted in the container bearing manner. Further, the target base station forwards the RRC release information to the terminal device.

In some embodiments, in Example 2, the fifth information includes second indication information, where the second indication information is used to indicate that the uplink data has been uploaded to the core network device.

In the embodiments of the present disclosure, the core network device may be, for example, a User Plane Function (UPF) entity.

Therefore, in the embodiments of the present disclosure, without retrieving the context of the terminal device, the target base station can forward the uplink data sent by the inactive terminal device to the anchor base station, so that the inactive terminal device can transmit the uplink data to the core network device. That is, the technical solutions of the present disclosure can realize early data transmission without migrating the context of the terminal device.

The data transmission solutions of the present disclosure will be described in detail below by way of Embodiment 1 and Embodiment 2.

In Embodiment 1, the uplink data sent by the terminal device in the inactive state is transmitted in the container bearing manner. As specifically shown in FIG. 8, the terminal device in the inactive state can implement the early data transmission specifically through the processes in S41 to S46 below.

In S41, the terminal device (in the inactive state) sends an RRC connection resume request to the target base station, and the RRC connection resume request includes the uplink data sent by the terminal device (that is, early data transmission (EDT)); and optionally, the RRC connection resume request includes Inactive Radio Network Temporary Identity (I-RNTI) and resume cause.

In S42, the target base station sends first information to the anchor base station, the first information is used to retrieve the context information of the terminal device (Retrieve UE Context Request), the first information includes the uplink data sent by the terminal device, and the uplink data is transmitted through the container bearing manner.

In S43, the anchor base station forwards the uplink data to the UPF entity.

In S44, the UPF entity sends downlink data to the anchor base station (optional).

In S45, the anchor base station sends second information to the target base station, the second information is used to indicate failure to retrieve the context information of the terminal device (Retrieve UE Context Failure); optionally, in the case where the UPF entity sends the downlink data to the anchor base station, the second information includes the downlink data, and the downlink data is transmitted in the container nearing manner; optionally, the second information includes first indication information, and the first indication information is used to indicate that the uplink data has been uploaded to the core network device (UPF entity).

In S46, the target base station sends an RRC connection release message to the terminal device; optionally, in the case where the UPF entity sends the downlink data to the anchor base station, the RRC connection release message includes the downlink data; and optionally, the RRC connection release message Including I-RNTI, release cause, and Network Color Code (NCC).

In Embodiment 2, the uplink data sent by the terminal device in the inactive state is transmitted in the tunnel bearing manner. As specifically shown in FIG. 9, the terminal device in the inactive state can implement the early data transmission specifically through the processes in S51 to S58 below.

In S51, the terminal device (in the inactive state) sends an RRC connection resume request to the target base station, and the RRC connection resume request includes the uplink data sent by the terminal device (that is, early data transmission (EDT)); and optionally, the RRC connection resume request includes I-RNTI, and resume cause.

In S52, the target base station sends third information to the anchor base station, the third information is used to retrieve the context information of the terminal device (Retrieve UE Context Request), and the third information includes information used for establishing the tunnel and information used for indicating that the uplink data is received.

In S53, the anchor base station sends fourth information to the target base station, where the fourth information includes information for establishing the tunnel fed back by the anchor base station.

In S54, the target base station sends first information to the anchor base station, where the first information includes uplink data sent by the terminal device in the inactive state, and the first information is transmitted in the tunnel bearing manner.

In S55, the anchor base station forwards the uplink data to the UPF entity.

In S56, the UPF entity sends downlink data to the anchor base station (optional).

In S57, the anchor base station sends fifth information to the target base station, the fifth information is used to indicate failure to retrieve the context information of the terminal device (Retrieve LTE Context Failure); optionally, in the case where the UPF entity sends the downlink data to the anchor base station, the fifth information includes the downlink data, and the downlink data is transmitted in the container bearing manner; and optionally, the fifth information includes second indication information, and the second indication information is used to indicate that the uplink data has been uploaded to the core network device (UPF entity).

In S58, the target base station sends an RRC connection release message to the terminal device; optionally, in the case where the UPF entity sends the downlink data to the anchor base station, the RRC connection release message includes the downlink data; and optionally, the RRC connection release message Including I-RNTI, release cause, and NCC.

Figure 8:
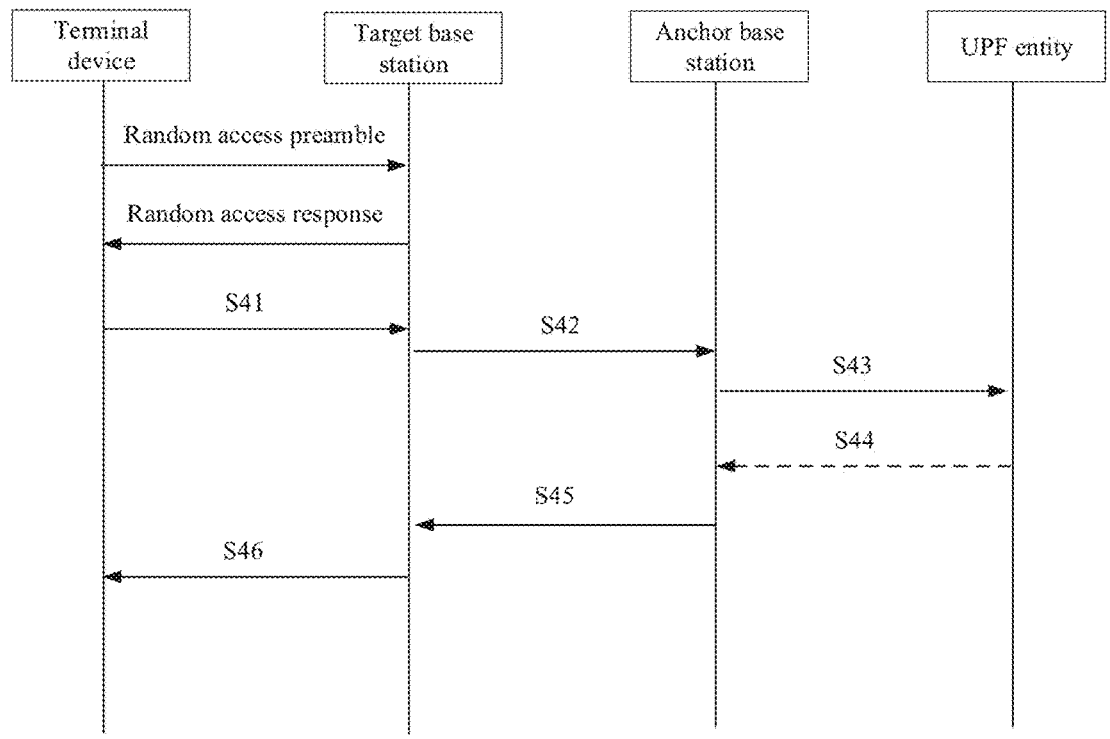
FIG. 8 is a schematic flowchart of transmitting uplink data through a container according to an embodiment of the present disclosure.
Figure 9:
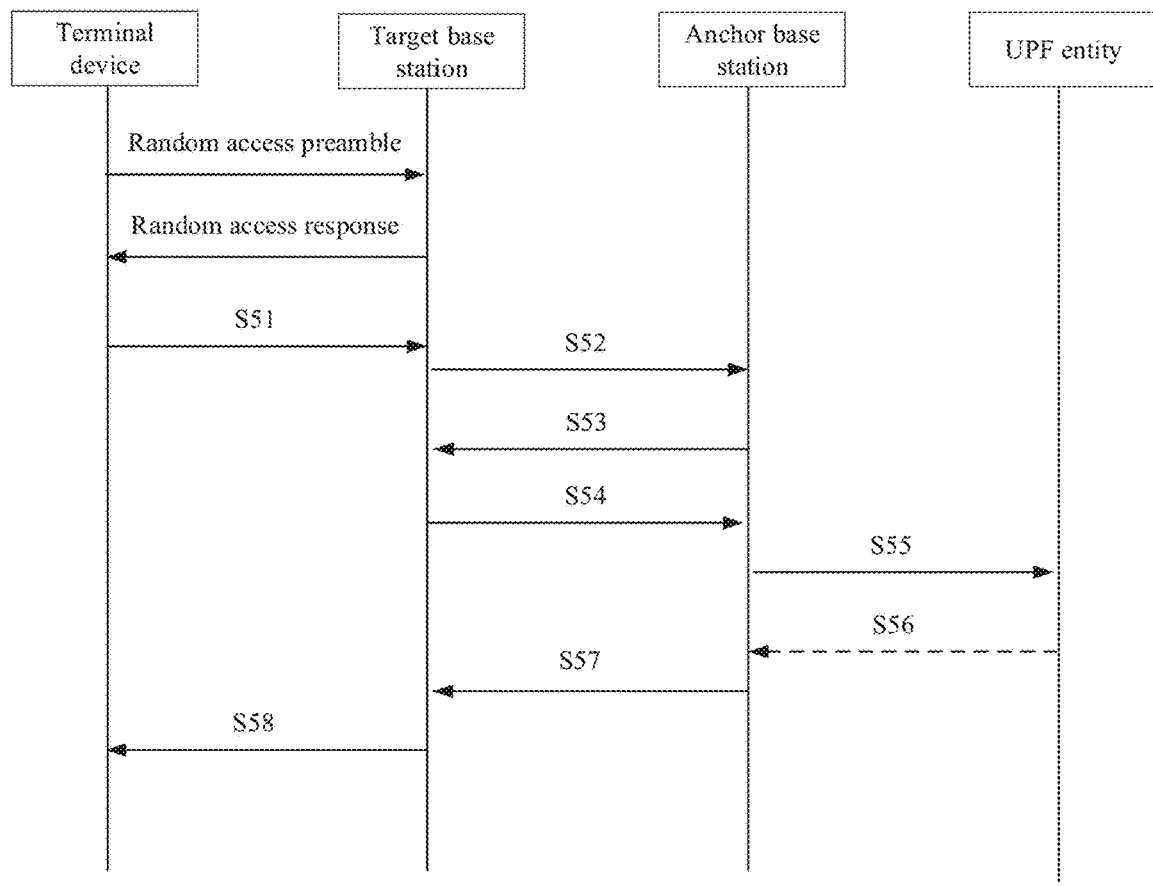
FIG. 9 is a schematic flowchart of transmitting uplink data through a tunnel according to an embodiment of the present disclosure.

The method embodiments of the present disclosure have been described in detail above with reference to FIGS. 7 to 9, and the device embodiments of the present disclosure are described in detail below in conjunction with FIGS. 10 to 14. It should be understood that the device embodiments and the method embodiments correspond to each other, and for similar description, reference can be made to the method embodiments.

Figure 10:
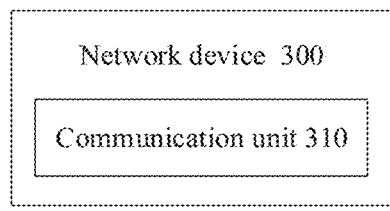
FIG. 10 is a schematic block diagram of a network device according to an embodiment of the present disclosure.

FIG. 10 shows a schematic block diagram of a network device 300 according to an embodiment of the present disclosure. As shown in FIG. 10, the network device 300 is a target base station, and the network device 300 includes:

a communication unit 310, configured to send first information to an anchor base station, where the first information includes uplink data sent by a terminal device in an inactive state, and the first information is transmitted in a container bearing manner, or the first information is transmitted in a tunnel bearing manner.

In some embodiments, in a case that the first information is transmitted in the container bearing manner, the first information is used to request to retrieve context information of the terminal device from the anchor base station.

In some embodiments, the communication unit 310 is further configured to receive second information sent by the anchor base station, where the second information is used to indicate failure to retrieve the context information of the terminal device, or the second information includes the context information of the terminal device.

In some embodiments, in the case where the second information is used to indicate failure to retrieve the context information of the terminal device, the second information includes radio resource control (RRC) release information, and the RRC release information is transmitted in the container bearing manner.

The communication unit 310 is further configured to forward the RRC release information to the terminal device.

In some embodiments, the second information includes first indication information, and the first indication information is used to indicate that the uplink data has been uploaded to a core network device.

In some embodiments, in the case where the first information is transmitted in the tunnel bearing manner, the communication unit 310 is further configured to trigger establishment of the tunnel.

In some embodiments, the communication unit 310 is specifically configured to:

send third information to the anchor base station, where the third information includes information for establishing the tunnel and information for indicating that the uplink data is received;

receive fourth information sent by the anchor base station, where the fourth information includes information for establishing the tunnel fed back by the anchor base station.

In some embodiments, the third information is used to request to retrieve the context information of the terminal device from the anchor base station.

In some embodiments, the communication unit 310 is further configured to receive fifth information sent by the anchor base station, where the fifth information is used to indicate failure to retrieve the context information of the terminal device, or the fifth information includes the context information of the terminal device.

In some embodiments, in a case that the fifth information is used to indicate failure to retrieve the context information of the terminal device, the fifth information includes RRC release information, and the RRC release information is transmitted in the container bearing manner;

The communication unit 310 is further configured to forward the RRC release information to the terminal device.

In some embodiments, the fifth information includes second indication information, and the second indication information is used to indicate that the uplink data has been uploaded to the core network device.

In some embodiments, the uplink data includes at least one of the following: user plane data, and control plane data.

In some embodiments, the uplink data is early data transmission (EDT).

In some embodiments, the communication unit 310 is further configured to receive RRC resume request information sent by the terminal device, where the RRC resume request information and the uplink data are multiplexed in one transport block.

In some embodiments, in some embodiments, the above-mentioned communication unit may be a communication interface or a transceiver, or an input-output interface of a communication chip or a system-on-chip.

It should be understood that the network device 300 according to the embodiment of the present disclosure may correspond to the target base station in the method embodiments of the present disclosure, and the above-mentioned and other operations and/or functions of each unit in the network device 300 are to realize the corresponding processes for the target base station in method 200 as shown in FIG. 7, which will not be repeated here for the sake of brevity.

Figure 11:
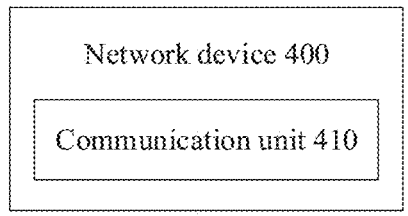
FIG. 11 is a schematic block diagram of another network device according to an embodiment of the present disclosure.

FIG. 11 shows a schematic block diagram of a network device 400 according to an embodiment of the present disclosure. As shown in FIG. 11, the network device 400 is an anchor base station, and the network device 400 includes:

a communication unit 410, configured to receive first information sent by a target base station, where the first information includes uplink data sent by a terminal device in an inactive state, and the first information is transmitted in a container bearing manner, or the first information is transmitted in a tunnel bearing manner.

In some embodiments, in a case that the first information is transmitted in the container bearing manner, the communication unit 410 is further configured to forward the first information to a core network device.

In some embodiments, the first information is used to request to retrieve context information of the terminal device from the anchor base station.

In some embodiments, the communication unit 410 is further configured to send second information to the target base station, where the second information is used to indicate failure to retrieve the context information of the terminal device, or the second information includes the context information of the terminal device.

In some embodiments, in a case that the second information is used to indicate failure to retrieve the context information of the terminal device, the second information includes radio resource control (RRC) release information, and the RRC release information is transmitted in the container bearing manner.

In some embodiments, the second information includes first indication information, and the first indication information is used to indicate that the uplink data has been uploaded to a core network device.

In some embodiments, in a case that the first information is transmitted in the tunnel bearing manner, the communication unit 410 is further configured to forward the uplink data to the core network device.

In some embodiments, the communication unit 410 is further configured to receive third information sent by the target base station, where the third information includes information for establishing the tunnel and information for indicating that the uplink data is received.

The communication unit 410 is further configured to send fourth information to the target base station, where the fourth information includes information for establishing the tunnel fed back by the anchor base station.

In some embodiments, the third information is used to request to retrieve the context information of the terminal device from the anchor base station.

In some embodiments, the communication unit 410 is further configured to send fifth information to the target base station, where the fifth information is used to indicate failure to retrieve the context information of the terminal device, or the fifth information includes the context information of the terminal device.

In some embodiments, in a case that the fifth information is used to indicate failure to retrieve the context information of the terminal device, the fifth information includes RRC release information, and the RRC release information is transmitted in the container bearing manner.

In some embodiments, the fifth information includes second indication information, and the second indication information is used to indicate that the uplink data has been uploaded to the core network device.

In some embodiments, the uplink data includes at least one of the following: user plane data, and control plane data.

In some embodiments, the uplink data is early data transmission (EDT).

In some embodiments, in some embodiments, the above-mentioned communication unit may be a communication interface or a transceiver, or an input-output interface of a communication chip or a system-on-chip.

It should be understood that the network device 400 according to the embodiment of the present disclosure may correspond to the anchor base station in the method embodiments of the present disclosure, and the above-mentioned and other operations and/or functions of each unit in the network device 400 are to realize the corresponding processes for the anchor base station in method 200 as shown in FIG. 7, which will not be repeated here for the sake of brevity.

Figure 12:
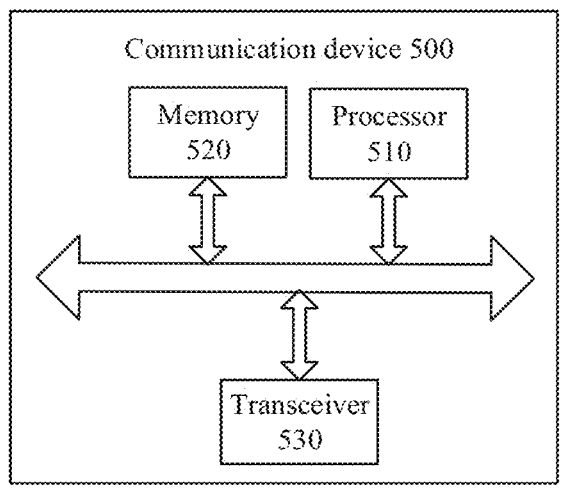
FIG. 12 is a schematic block diagram of a communication device according to an embodiment of the present disclosure.

FIG. 12 is a schematic structural diagram of a communication device 500 according to an embodiment of the present disclosure. The communication device 500 shown in FIG. 12 includes a processor 510. The processor 510 can call and run a computer program from a memory to carry out the methods in the embodiments of the present disclosure.

In some embodiments, as shown in FIG. 12, the communication device 500 can further include a memory 520. The processor 510 can call and run the computer program from the memory 520 to implement the methods in the embodiments of the present disclosure.

The memory 520 can be a separate device independent of the processor 510, or can be integrated in the processor 510.

In some embodiments, as shown in FIG. 12, the communication device 500 can further include a transceiver 530, and the processor 510 can control the transceiver 530 to communicate with other devices, and specifically, to transmit information or data to other devices, or to receive information or data transmitted from other devices.

The transceiver 530 can include a transmitter and a receiver. The transceiver 530 can further include an antenna, and the number of the antennas can be one or more.

In some embodiments, the communication device 500 can specifically be the network device in the embodiments of the present disclosure, and the communication device 500 can carry out the corresponding processes which are implemented by the target base station in the methods of the embodiments of the present disclosure, which will not be repeated here for the sake of brevity.

In some embodiments, the communication device 500 can specifically be the network device in the embodiments of the present disclosure, and the communication device 500 can carry out the corresponding processes which are implemented by the anchor base station in the methods of the embodiments of the present disclosure, which will not be repeated here for the sake of brevity.

Figure 13:
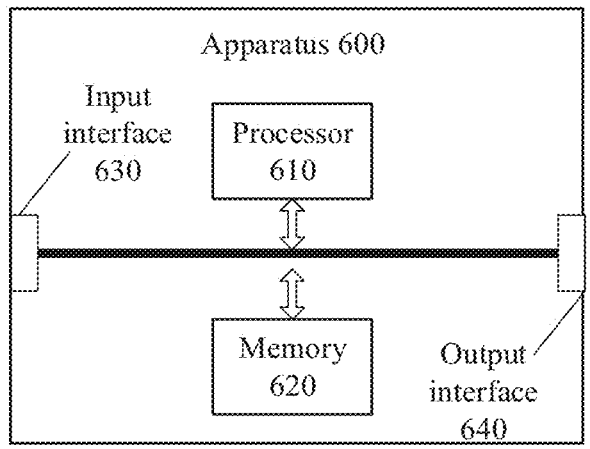
FIG. 13 is a schematic block diagram of an apparatus provided according to an embodiment of the present disclosure.

FIG. 13 is a schematic structural diagram of a device according to an embodiment of the present disclosure. The device 600 shown in FIG. 13 includes a processor 610 which can call and run a computer program from a memory to carry out the methods in the embodiments of the present disclosure.

In some embodiments, as shown in FIG. 13, the device 600 can further include a memory 620. The processor 610 can call and run the computer program from the memory 620 to implement the methods according to the embodiments of the present disclosure.

The memory 620 can be a separate device independent of the processor 610, or can be integrated in the processor 610.

In some embodiments, the device 600 can further include an input interface 630. The processor 610 can control the input interface 630 to communicate with other devices or chips, and specifically, to obtain information or data transmitted by other devices or chips.

In some embodiments, the device 600 can further include an output interface 640. The processor 610 can control the output interface 640 to communicate with other devices or chips, and specifically, to output information or data to other devices or chips.

In some embodiments, the device can be applied to the network device in the embodiments of the present disclosure, and the device can carry out the corresponding processes which are implemented by the target base station in the methods of the embodiments of the present disclosure, which will not be repeated here for the sake of brevity.

In some embodiments, the device can be applied to the network device in the embodiments of the present disclosure, and the device can carry out the corresponding processes which are implemented by the anchor base station in the methods of the embodiments of the present disclosure, which will not be repeated here for the sake of brevity.

In some embodiments, the device mentioned in the embodiments of the present disclosure may also be a chip. For example, it may be a system level chip, a system chip, a chip system, or a system-on-a-chip.

Figure 14:
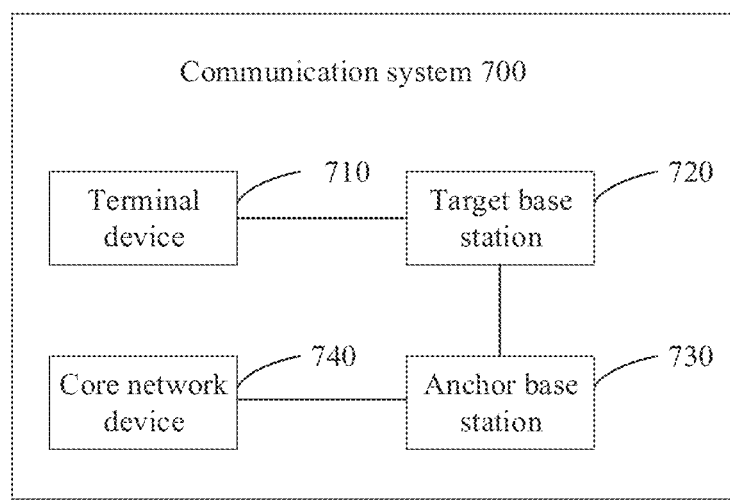
FIG. 14 is a schematic block diagram of a communication system according to an embodiment of the present disclosure.

FIG. 14 is a schematic block diagram of a communication system 700 provided by an embodiment of the present disclosure. As shown in FIG. 14, the communication system 700 includes a terminal device 710, a target base station 720, an anchor base station 730 and a core network device 740.

The terminal device 710 can be configured to realize the corresponding functions implemented by the terminal device in the above methods, the target base station 720 can be configured to realize the corresponding functions implemented by the target base station in the above methods, and the anchor base station 730 can be configured to realize the corresponding functions implemented by the anchor base station in the above methods, which will not be repeated here for the sake of brevity.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

In some embodiments, the computer-readable storage medium can be applied to the network device in the embodiments of the present disclosure, and the computer program causes a computer to perform the corresponding processes which are implemented by the target base station in the methods of the embodiments of the present disclosure, which will not be repeated here for the sake of brevity.

In some embodiments, the computer-readable storage medium can be applied to the network device in the embodiments of the present disclosure, and the computer program causes a computer to perform the corresponding processes which are implemented by the anchor base station in the methods of the embodiments of the present disclosure, which will not be repeated here for the sake of brevity.

An embodiment of the present disclosure also provides a computer program product including computer program instructions.

In some embodiments, the computer program product can be applied to the network device in the embodiments of the present disclosure, and the computer program instructions cause a computer to perform the corresponding processes implemented by the target base station in the methods according to the embodiments of the present disclosure, which will not be repeated here for the sake of brevity.

In some embodiments, the computer program product can be applied to the network device in the embodiments of the present disclosure, and the computer program instructions cause a computer to perform the corresponding processes implemented by the anchor base station in the methods according to the embodiments of the present disclosure, which will not be repeated here for the sake of brevity.

An embodiment of the present disclosure also provides a computer program.

In some embodiments, the computer program can be applied to the network device in the embodiments of the present disclosure, and when running on a computer, the computer program causes the computer to perform the corresponding process implemented by the target base station in the methods according to the embodiments of the present disclosure, which will not be repeated here for the sake of brevity.

In some embodiments, the computer program can be applied to the network device in the embodiments of the present disclosure, and when running on a computer, the computer program causes the computer to perform the corresponding process implemented by the anchor base station in the methods according to the embodiments of the present disclosure, which will not be repeated here for the sake of brevity.

Through the above technical solutions, without retrieving the context of the terminal device, the target base station can forward the uplink data sent by the inactive terminal device to the anchor base station, so that the inactive terminal device can transmit the uplink data to the core network device. That is, the technical solutions of the present disclosure can realize early data transmission without migrating the context of the terminal device.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed over multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. With such understanding, the technical solution of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A data transmission method, comprising:
sending, by a target base station, first information to an anchor base station, wherein the first information comprises uplink data sent by a terminal device in an inactive state, the first information is transmitted in a container bearing manner, the first information is used to request to retrieve context information of the terminal device from the anchor base station, and in the container bearing manner, the first information is invisible to the anchor base station and is transparently transmitted through the anchor base station;
receiving, by the target base station, second information sent by the anchor base station, wherein the second information is used to indicate failure to retrieve the context information of the terminal device, the second information comprises radio resource control (RRC) release information, and the RRC release information is transmitted in the container bearing manner; and
forwarding, by the target base station, the RRC release information to the terminal device,
wherein the second information comprises first indication information, and the first indication information is used to indicate that the uplink data has been uploaded to a core network device.

2. The method according to claim 1, wherein the uplink data includes at least one of the following:
user plane data, and control plane data.

3. The method according to claim 1, wherein the uplink data is early data transmission EDT.

4. The method according to claim 1, further comprising:
receiving, by the target base station, RRC resume request information sent by the terminal device, wherein the RRC resume request information and the uplink data are multiplexed in one transport block.

5. A data transmission method, comprising:
receiving, by an anchor base station, first information sent by a target base station, wherein the first information comprises uplink data sent by a terminal device in an inactive state, the first information is transmitted in a container bearing manner, the first information is used to request to retrieve context information of the terminal device from the anchor base station, and in the container bearing manner, the first information is invisible to the anchor base station and is transparently transmitted through the anchor base station; and
sending, by the anchor base station, second information to the target base station, wherein the second information is used to indicate failure to retrieve the context information of the terminal device, the second information comprises radio resource control (RRC) release information, and the RRC release information is transmitted in the container bearing manner, and
wherein the second information comprises first indication information, and the first indication information is used to indicate that the uplink data has been uploaded to a core network device.

6. The method according to claim 5, wherein in a case that the first information is transmitted in the container bearing manner, the method further comprises:
forwarding, by the anchor base station, the first information to a core network device.

7. A network device comprising a processor and a memory for storing a computer program, wherein the processor is configured to call and run the computer program stored in the memory to perform the method according to claim 5.

8. A network device, comprising:
a transceiver;
a processor; and
a memory for storing a computer program,
wherein the processor is configured to call and run the computer program stored in the memory to cause the network device to:
send, with the transceiver, first information to an anchor base station, wherein the first information comprises uplink data sent by a terminal device in an inactive state, the first information is transmitted in a container bearing manner, the first information is used to request to retrieve context information of the terminal device from the anchor base station, and in the container bearing manner, the first information is invisible to the anchor base station and is transparently transmitted through the anchor base station;
receive, with the transceiver, second information sent by the anchor base station, wherein the second information is used to indicate failure to retrieve the context information of the terminal device, the second information comprises radio resource control (RRC) release information, and the RRC release information is transmitted in the container bearing manner; and
forward, with the transceiver, the RRC release information to the terminal device,
wherein the second information comprises first indication information, and the first indication information is used to indicate that the uplink data has been uploaded to a core network device.

* * * * *